United States Patent
Goodwill et al.

(10) Patent No.: US 9,927,677 B2
(45) Date of Patent: Mar. 27, 2018

(54) OPTICAL INTERFEROMETER DEVICE TOLERANT TO INACCURACY IN DOPING OVERLAY

(71) Applicants: Dominic John Goodwill, Ottawa (CA); Jia Jiang, Ottawa (CA)

(72) Inventors: Dominic John Goodwill, Ottawa (CA); Jia Jiang, Ottawa (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 15/179,031

(22) Filed: Jun. 10, 2016

(65) Prior Publication Data

US 2017/0357140 A1    Dec. 14, 2017

(51) Int. Cl.
| | |
|---|---|
| G02F 1/035 | (2006.01) |
| G02F 1/225 | (2006.01) |
| G02B 6/293 | (2006.01) |
| G02F 1/025 | (2006.01) |
| G02F 1/313 | (2006.01) |

(Continued)

(52) U.S. Cl.
CPC ....... *G02F 1/2257* (2013.01); *G02B 6/29346* (2013.01); *G02B 6/29349* (2013.01); *G02B 6/29352* (2013.01); *G02F 1/025* (2013.01); *G02F 1/3136* (2013.01); *G02F 2001/0157* (2013.01); *G02F 2001/212* (2013.01); *G02F 2001/215* (2013.01)

(58) Field of Classification Search
CPC ............. G02F 1/2257; G02F 2001/212; G02B 6/29346; G02B 6/29349; G02B 6/29352; G02B 6/29353
See application file for complete search history.

(56) References Cited

U.S. PATENT DOCUMENTS

| | | | | |
|---|---|---|---|---|
| 6,122,414 A | * | 9/2000 | Shimizu ................ | G02F 1/2257 359/237 |
| 6,836,351 B2 | * | 12/2004 | Livingston ............. | B82Y 10/00 257/E29.071 |

(Continued)

FOREIGN PATENT DOCUMENTS

| | | |
|---|---|---|
| CN | 101937135 A | 1/2011 |
| CN | 102967951 A | 3/2013 |

(Continued)

OTHER PUBLICATIONS

Xing, Jiejiang, et al., "Compact silicon-on-insulator-based 2 × 2 Mach-Zehnder interferometer electro-optic switch with low crosstalk," Chinese Optics Letters, COL. 13(6), 061301, 2015.

(Continued)

*Primary Examiner* — Rhonda Peace
(74) *Attorney, Agent, or Firm* — Gowling WLG (Canada) LLP

(57) ABSTRACT

An optical interferometer device is provided including a waveguide interferometer. The waveguide interferometer includes first and second waveguide arms in a waveguide plane, each waveguide arm including a n-type region and a p-type region forming a junction. The n-type region and the p-type region of the second waveguide arm are translationally symmetric with respect to the n-type region and the p-type region, respectively, of the first waveguide arm in the waveguide plane.

18 Claims, 17 Drawing Sheets

(51) Int. Cl.
*G02F 1/015* (2006.01)
*G02F 1/21* (2006.01)

(56) References Cited

U.S. PATENT DOCUMENTS

| | | | |
|---|---|---|---|
| 8,520,984 B2* | 8/2013 | Webster | G02F 1/2257 385/1 |
| 8,644,650 B2* | 2/2014 | Evans | G02F 1/0121 385/14 |
| 9,128,308 B1* | 9/2015 | Zortman | G02F 1/025 |
| 9,151,592 B2* | 10/2015 | Mizrahi | G01B 9/02049 |
| 9,239,506 B2* | 1/2016 | Manouvrier | G02F 1/2257 |
| 9,541,775 B2* | 1/2017 | Ayazi | G02F 1/025 |
| 2004/0201079 A1* | 10/2004 | Scott | G02F 1/2257 257/603 |
| 2010/0316324 A1 | 12/2010 | Webster et al. | |
| 2013/0170782 A1* | 7/2013 | Evans | G02F 1/225 385/3 |
| 2013/0209023 A1* | 8/2013 | Prosyk | G02F 1/011 385/3 |
| 2014/0286647 A1 | 9/2014 | Ayazi et al. | |

FOREIGN PATENT DOCUMENTS

| | | |
|---|---|---|
| CN | 105044931 A | 11/2015 |
| JP | 2009037013 A | 2/2009 |
| WO | 2011022308 A2 | 2/2011 |

OTHER PUBLICATIONS

Ding, Ran, et al., "Design and characterization of a 30-GHz bandwidth low-power silicon traveling-wave modulator," Optics Communication, vol. 321, pp. 124-133, 2014.

International Search Report for corresponding International Application No. PCT/CN2017/083781 dated Aug. 3, 2017.

* cited by examiner

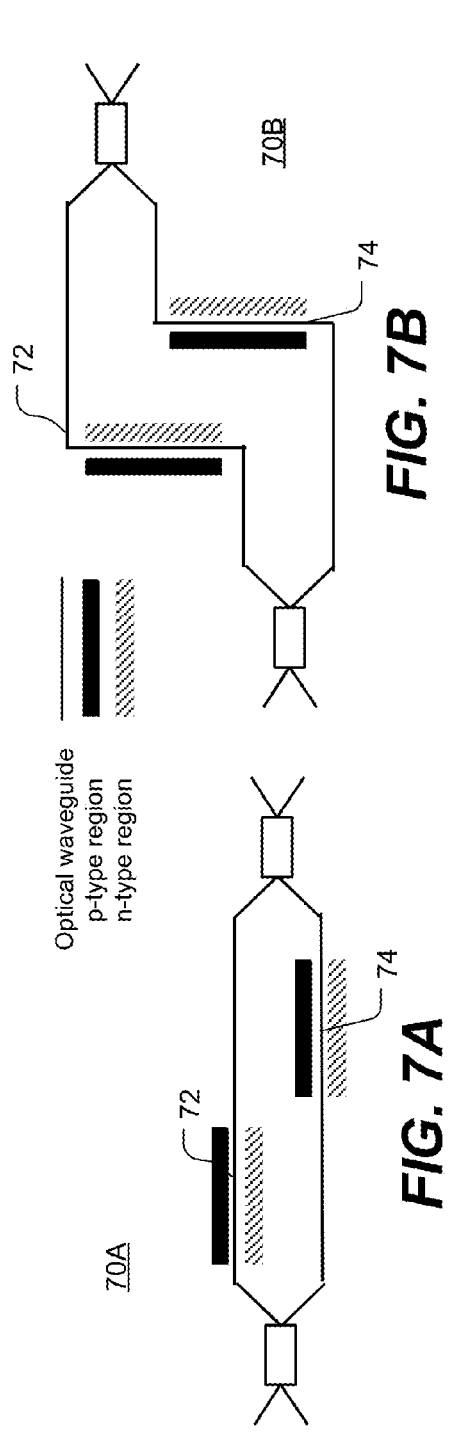
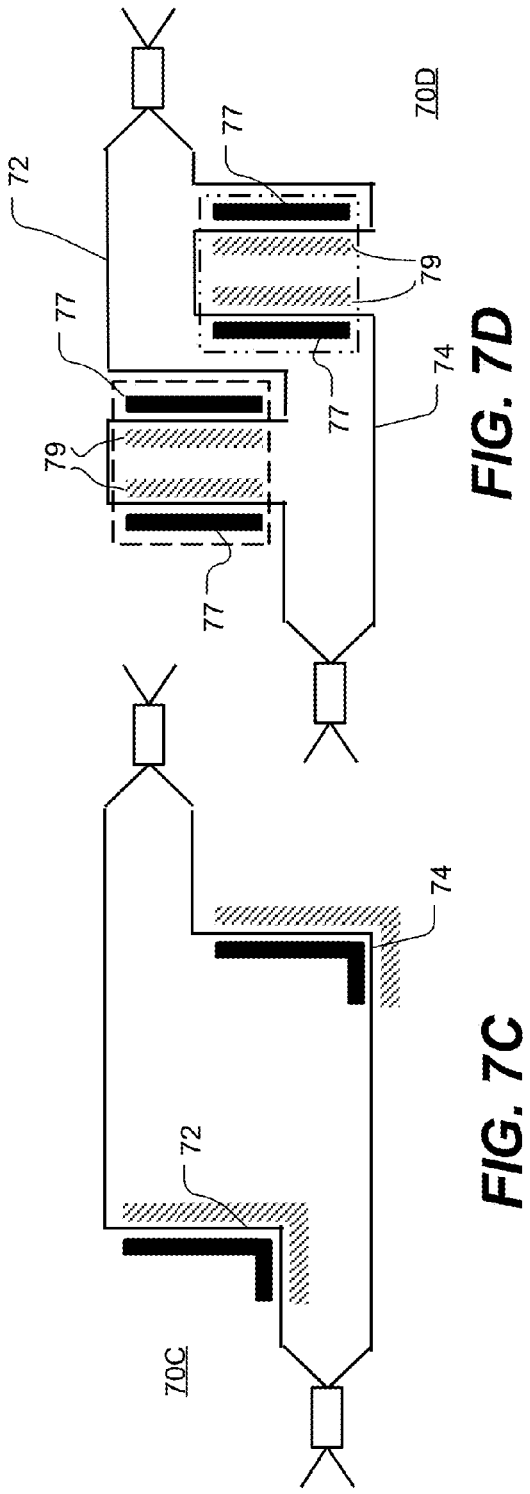
FIG. 7A
FIG. 7B
FIG. 7C
FIG. 7D

OPTICAL INTERFEROMETER DEVICE TOLERANT TO INACCURACY IN DOPING OVERLAY

TECHNICAL FIELD

The present disclosure relates to an optical interferometer device, and more particularly, to an optical interferometer device that can be tolerant to inaccuracy in doping overlay.

BACKGROUND

In optical communications systems, optical interferometer devices are frequently used to filter and switch optical signals. Due to their compactness and suitability for mass production, waveguide-based interferometers are finding increased use. A carrier-injection waveguide interferometer may include two parallel p-n junctions disposed on, or proximate to, two corresponding arms of the interferometer. For best performance, it may be desirable to have balanced optical absorption in the two arms of the interferometer. However, manufacturing imperfections may result in a discrepancy in optical absorption between the two arms of the interferometer. This discrepancy can in turn translate into a reduced optical performance of the interferometer.

It is therefore desirable to provide a waveguide-based optical interferometer device that would be more tolerant to manufacturing imperfections.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

Disclosed herein are optical interferometer devices containing junctions that can be tolerant to inaccuracies in doping overlay. Such devices include optical modulators, photonic switches, variable optical filters, or any other optical interferometer devices including at least one interferometer.

In accordance with one aspect of the disclosure, an optical interferometer device is described including a waveguide interferometer. The waveguide interferometer includes first and second waveguide arms in a waveguide plane, each waveguide arm including a n-type region and a p-type region forming a junction. The n-type region and the p-type region of the second waveguide arm are translationally symmetric with respect to the n-type region and the p-type region, respectively, of the first waveguide arm in the waveguide plane.

In accordance with another aspect of the disclosure, a method of manufacturing an optical interferometer device is described. The method includes forming optical waveguides of a waveguide interferometer, the waveguide interferometer including first and second waveguide arms; forming n-type regions for the first and second waveguide arms; and forming p-type regions for the first and second waveguide arms. The n-type region and the p-type region of the second waveguide arm are translationally symmetric with respect to the n-type region and the p-type region, respectively, of the first waveguide arm in the waveguide plane.

BRIEF DESCRIPTION OF THE DRAWINGS

These and other features of the disclosure will become more apparent from the description in which reference is made to the following appended drawings.

FIG. 7A is a schematic diagram of an optical interferometer device, according to an alternative embodiment of the disclosure.

FIG. 7B is a schematic diagram of an optical interferometer device, according to another alternative embodiment of the disclosure.

FIG. 7C is a schematic diagram of an optical interferometer device, according to another alternative embodiment of the disclosure.

FIG. 7D is a schematic diagram of an optical interferometer device, according to another alternative embodiment of the disclosure.

DETAILED DESCRIPTION

Figure 1:
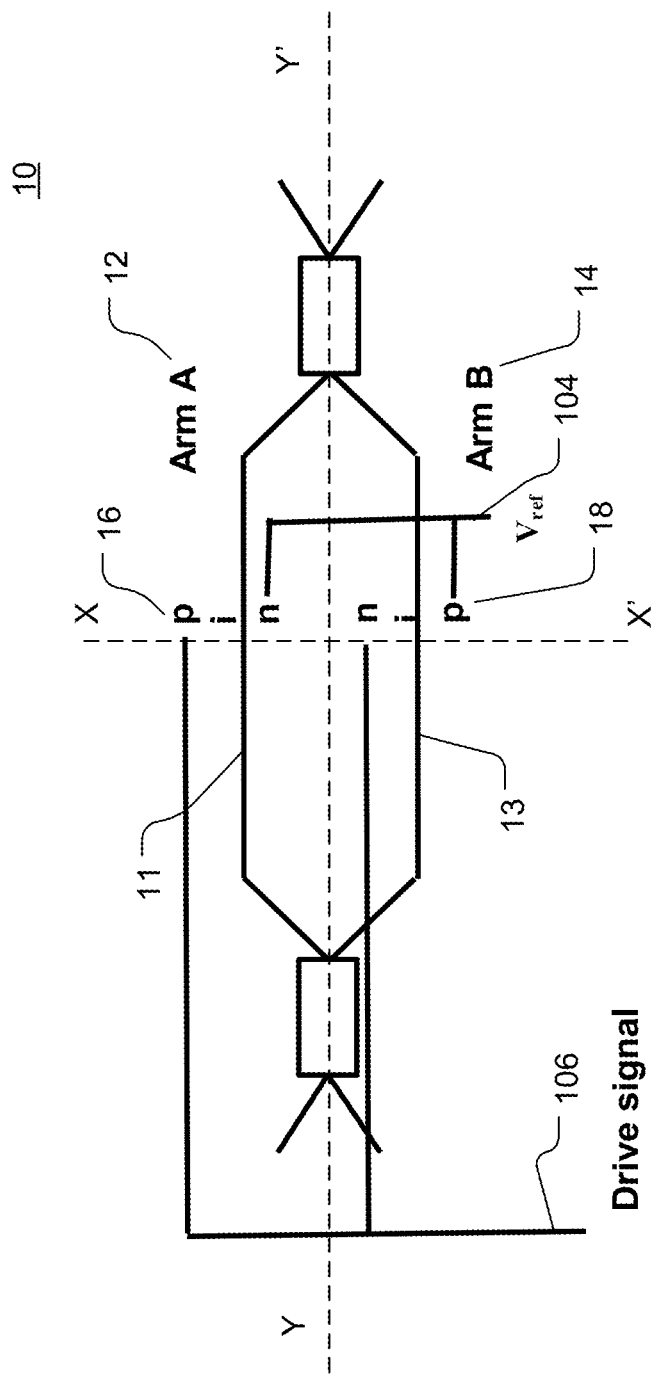
FIG. 1 is a schematic diagram of a prior art optical interferometer device.

The following detailed description contains, for the purposes of explanation, various illustrative embodiments, implementations, examples and specific details in order to provide a thorough understanding of the disclosure. It is apparent, however, that the disclosed embodiments may be practiced, in some instances, without these specific details or with an equivalent arrangement. The description should in no way be limited to the illustrative implementations, drawings, and techniques illustrated below, including the exemplary designs and implementations illustrated and described herein, but may be modified within the scope of the appended claims along with their full scope of equivalents.

Disclosed herein are optical interferometer devices containing semiconductor junctions that can be tolerant to inaccuracies in doping overlay. Such devices include optical modulators, photonic switches, tunable optical filters, or any other optical interferometer devices including at least one interferometer having two p-n junctions disposed on, or proximate to its two corresponding waveguide arms.

In the context of the present disclosure, a p-n junction is referred to broadly encompass a p-n type junction, a p-i-n type junction (p-region and n-region separated by an isolation region), or generally a junction the active region of which is formed by joining at least one n-type semiconductor material with at least one p-type semiconductor material directly or indirectly together. A lithographic mask can be used to define the optical waveguide structure in each arm that supports at least one optical mode in one arm. Typically one mask defines the critical geometry of both optical waveguides, although more than one mask can be used. Lithographic masks can also be used to define the location of the p-type and n-type doping regions. The term "doping overlay" or "lithographic overlay" refers to the placement accuracy of the lithographic masks that define the respective positions of the optical modes, p-type regions and n-type regions.

As will be illustrated below, conventional optical interferometer devices containing junctions are typically arranged with mirror symmetry (or reflection symmetry) with respect to a direction generally parallel to the waveguides. That is, the relative position of the n-type region and the p-type region of one arm is the opposite to the relative position of the n-type region and p-type region of the other arm. For example, a conventional optical interferometer device can present Arm 1 in the form of a p-n junction, and Arm 2 in the form of a n-p junction along a direction generally perpendicular to the waveguides.

However, there are many fabrication and manufacturing factors that may affect the reflection symmetry, either inadvertently or deliberately. For example, angled doping may introduce deliberate manufacturing asymmetry. As well, misalignment of lithographic masks could result in one arm having a wider junction than the other. Such variations could be random from wafer to wafer. These manufacturing variations may contribute to a discrepancy in optical absorption between the two arms which can affect the contrast ratio and/or extinction ratio of the device. Furthermore, a narrow junction has larger electric field in the junction and higher capacitance, compared to a wider junction. This can affect the contrast ratio, extinction ratio, chirp and frequency response of the device. Therefore, overall optoelectronic response of the waveguide interferometer may be affected. In the context of the present disclosure, the term "optoelectronic response" refers to the optical, electro-optic and electrical response of the waveguide interferometer.

The optical interferometer device containing junctions according to various embodiments of the present disclosure includes a waveguide interferometer including first and second waveguide arms arranged in a waveguide plane. Each waveguide arm includes a n-type region and a p-type region forming a junction. The n-type region and the p-type region of the second waveguide arm are translationally symmetric with respect to the n-type region and the p-type region, respectively, of the first waveguide arm in the waveguide plane, in the sense that the optical interferometer device has the same relative position between the n-type region and the p-type region with respect to the corresponding waveguide. For the purpose of the present disclosure, the term "translational symmetry" refers to two objects being generally identical along a direction. For example, the optical interferometer device can present Arm 1 in the form of a p-n junction, and Arm 2 also in the form of a p-n junction along a direction in the waveguide plane. Of course, it should be appreciated that the optical interferometer device can alternatively present Arm 1 in the form of a n-p junction, and Arm 2 also in the form of a n-p junction. As well, various shapes and arrangements of the n-type regions and p-type regions can be used, depending on the shapes and arrangements of the optical waveguides, as will be explained in more detail below.

As will be illustrated below, the device can achieve a translational symmetry along a direction in the waveguide plane. In the context of the present disclosure, the term "lateral" or "laterally" refers to a direction in the waveguide plane parallel to the substrate of the optical interferometer device. The term "vertical" refers to a direction perpendicular to the substrate of the optical interferometer device. When an effect involves both vertical and lateral movements of the dopants, the term "lateral" refers to a lateral component of the movement. According to the disclosed embodiments, the optical mode, n-type region and p-type region may be mutually displaced from nominal ideal positions. However, by way of the translational symmetry of the two arms, the optical mode, n-type region and p-type region can be similarly displaced among the two arms of the interferometer thereby achieving a better balance of optoelectronic response between the two arms of the interferometer.

A schematic diagram of a prior art optical interferometer device is shown in FIG. 1. In comparison with FIG. 1, FIG. 2 is a schematic diagram of an optical interferometer device, according to an embodiment of the disclosure.

In the example as shown in FIG. 1, an optical interferometer device 10 includes a waveguide interferometer having a first waveguide arm (Arm A) 12, including a waveguide 11, and a second waveguide arm (Arm B) 14, including a waveguide 13. Arm A 12 includes a p-i-n junction 16, and Arm B 14 includes a p-i-n junction 18. As shown, the structure of the p-i-n junction of Arm A 12 is reflection-symmetric with respect to the structure of the p-i-n junction of Arm B 14 along a direction generally parallel to the waveguides 11, 13, that is, along the line Y-Y' in FIG. 1. In other words, the n-type region and the p-type region are arranged in one order on Arm A 12 with respect to the waveguide 11 and in a reversed order on Arm B 14 with respect to the waveguide 13.

Figure 2:
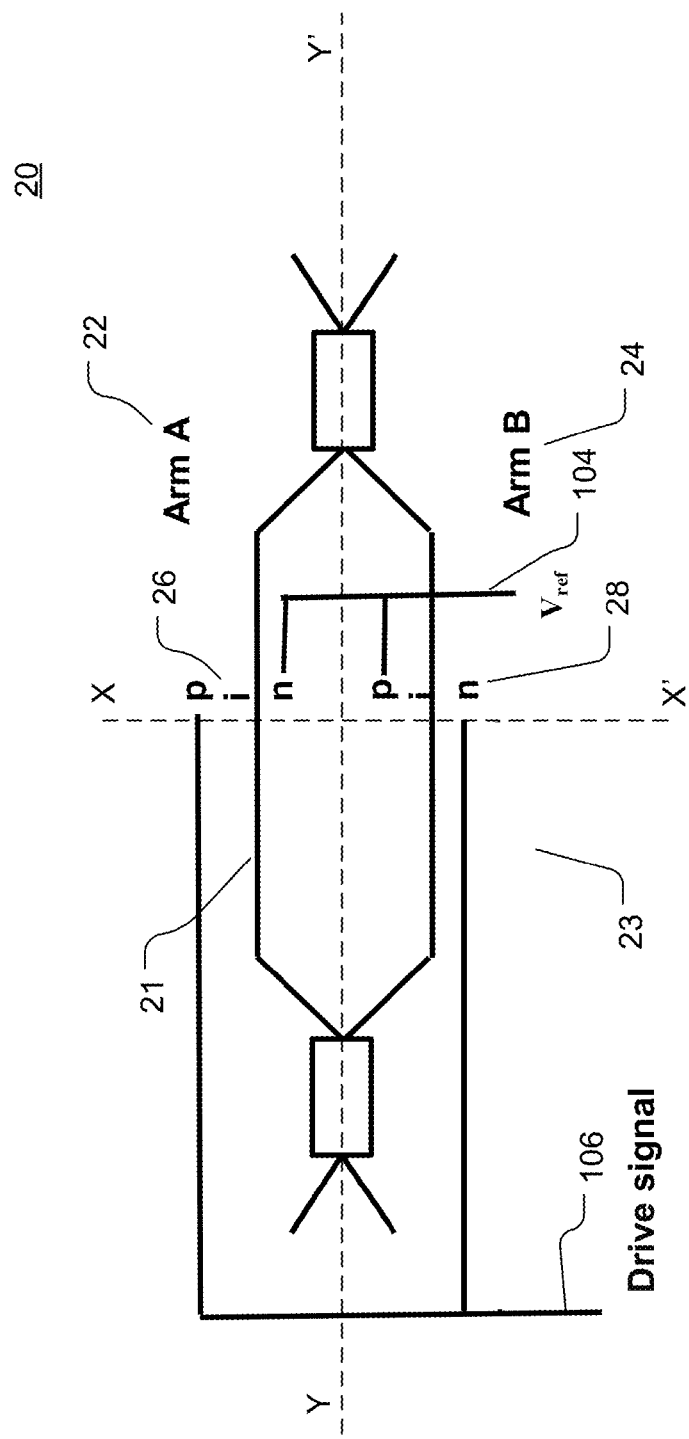
FIG. 2 is a schematic diagram of an optical interferometer device, according to an embodiment of the disclosure.

Referring now to FIG. 2, an optical interferometer device 20 according to one embodiment of the disclosure includes a waveguide interferometer having a first waveguide arm (Arm A) 22 including a waveguide 21 and a second waveguide arm (Arm B) 24 including a waveguide 23. Arm A 22 includes a p-i-n junction 26, and Arm B 24 includes a p-i-n junction 28. The p-i-n junction 26 of Arm A 22 is translationally symmetric with respect to the p-i-n junction 28 of Arm B 24 in the waveguide plane. In the embodiment shown by way of example in FIG. 2, the p-i-n junction 26 is translationally symmetric with respect to the p-i-n junction 28 along a direction generally perpendicular to the waveguides 21, 23, that is, along the line X-X'. The n-type region and the p-type region are arranged in the same order for each arm 22, 24 along the line X-X'. It should however be understood that the translational symmetry between the two arms 22, 24 can be along various other directions, depending on the shape of the waveguides 21, 23, and the arrangements of the p-i-n junctions 26, 28 on the waveguides 21, 23.

The device in FIG. 2 is shown as a device in which both arms 22, 24 are driven by means of a single-terminal electrical drive. The n-type region of the junction 26 of Arm A 22 is electrically coupled to the p-type region of the junction 28 of Arm B 24. In particular, the p-type region of Arm A 22 and n-type region of Arm B 24 are connected to a drive signal 106, while the n-type region of Arm A 22 and p-type region of Arm B 24 are connected to a reference voltage $V_{ref}$ 104. The device 20 of FIG. 2 can function as an optical carrier injection switch. One p-n junction can be forward biased, and the other p-n junction can be unbiased, reversed biased or weakly forward biased. When the device switches between a 0 state and a 1 state, the roles of the two arms are swapped. Alternatively, the device 20 can function as an optical modulator.

Figure 3A:
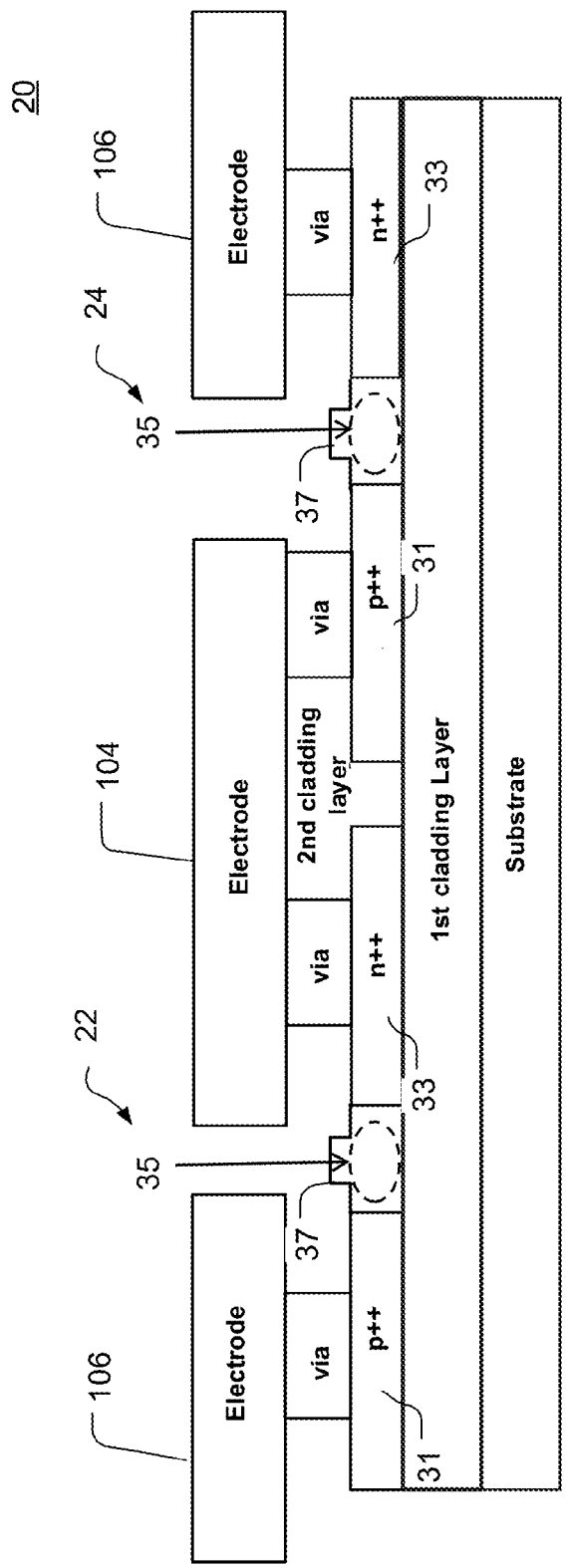
FIG. 3A is a cross-sectional view of the optical interferometer device of FIG. 2, taken along the line X-X'.

FIG. 3A is a cross-sectional view of the optical interferometer device 20 of FIG. 2, taken along the line X-X.

As shown in the cross-sectional view, each arm 22, 24 includes a p-n junction formed by a p-type region 31 and a n-type region 33 with an optical mode 35 formed in an undoped or lightly-doped core between the p-type region 31 and the n-type region 33. The location of the optical mode 35 supported by the respective optical waveguide is defined by a ridge portion 37 formed by the pattern of the lithographic mask. The optical mode 35 is intended to be located in the center between the p-type region 31 and the n-type region 33 so that the two arms 22, 24 can be identical in the device 20.

Figure 3B:
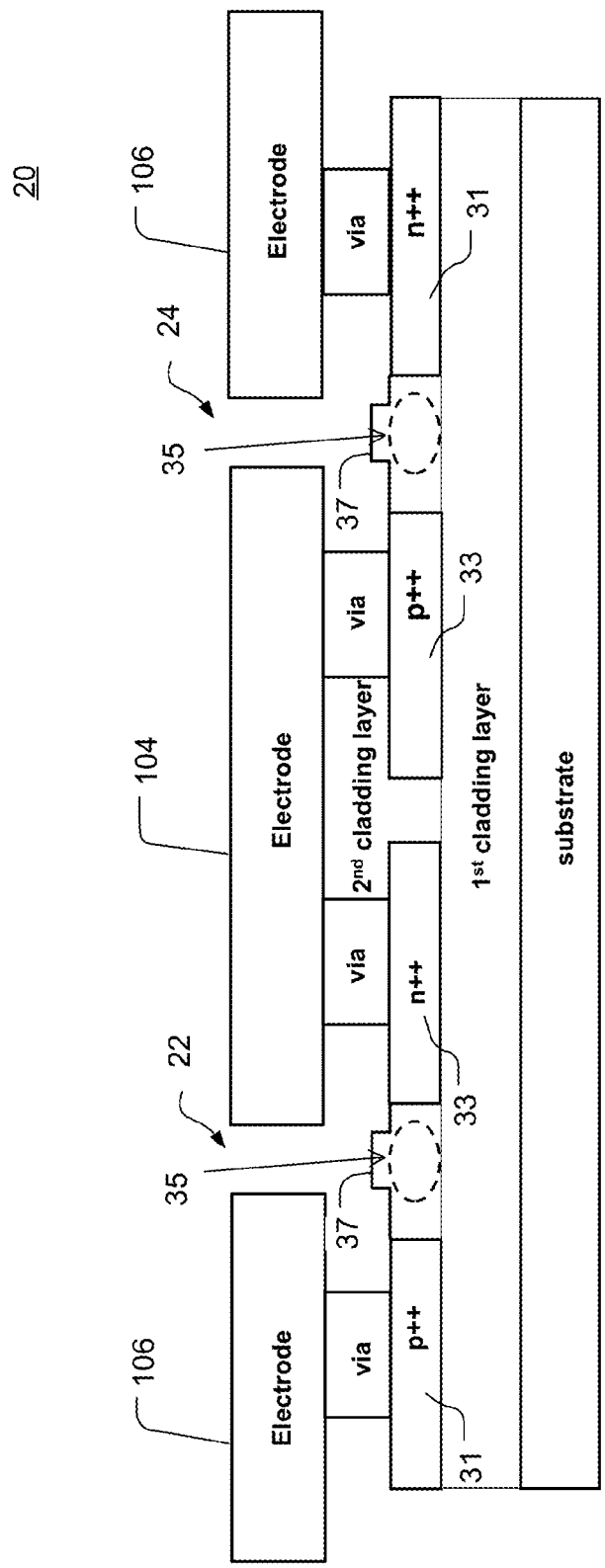
FIG. 3B is a cross-sectional view of the optical interferometer device of FIG. 2, showing the result of an asymmetric fabrication.

FIG. 3B is a cross-sectional view of the optical interferometer device 20 of FIG. 2, showing a result of an asymmetric fabrication.

As shown in FIG. 3B, the optical modes 35 have moved negligibly with respect to the silicon core. This may be caused by misalignment of lithographic mask in the formation of the optical modes 35. As a result of the misalignment of the optical mode 35 with respect to the p-n regions, n-type doping is closer to the optical mode 35 for Arm A 22. But the translationally symmetric arrangement of the two arms 22, 24 enables a similar result for Arm B 24, in that n-type doping is also made closer to the optical mode 35 for Arm B 24. This way, the two arms 22, 24 can still maintain a good balance in terms of optical absorption and a better balance of optoelectronic response between the two arms 22, 24 of the interferometer can be achieved.

The optical interferometer device according to the various embodiments can address the fabrication/manufacturing asymmetry that affects the performance of the conventional optical interferometer devices.

According to the various embodiments, the optical interferometer device can have a better balance between the two arms, without using more expensive lithography. Because the arms are better balanced, the 0 state electrical driving conditions can be equal (and opposite) to the 1 state driving conditions, so the drive circuit can be made simpler. As well, the contrast ratio can be improved so the optical signal quality is better. Angled implant doping can be used, particularly for devices where a special vertical doping profile is desired. There is therefore more flexibility to improve the optoelectronic characteristics of the device, by using the various embodiments as disclosed.

Figure 4:
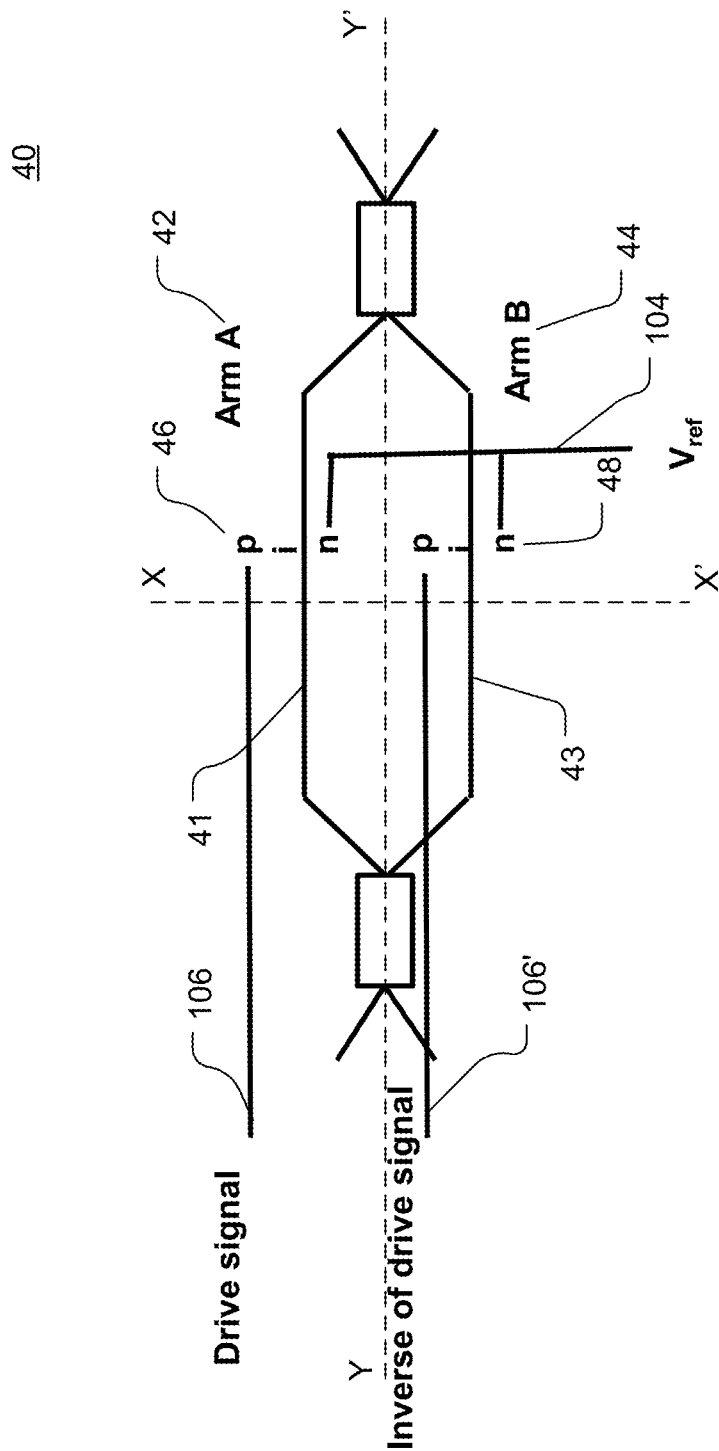
FIG. 4 is a schematic diagram of an optical interferometer device, according to another embodiment of the disclosure.

FIG. 4 is a schematic diagram of an optical interferometer device 40, according to another embodiment of the disclosure.

Similar to the embodiment shown in FIG. 2, the optical interferometer device 40 includes a waveguide interferometer having Arm A 42 including a waveguide 41 and Arm B 44 including a waveguide 43. Arm A 42 includes a p-i-n junction 46, and Arm B 44 includes a p-i-n junction 48. The p-i-n junction 46 of Arm A 42 is translationally symmetric with respect to the p-i-n junction 48 of Arm B 44 in the waveguide plane. In the embodiment shown by way of example in FIG. 4, the p-i-n junction 46 of Arm A 42 is translationally symmetric with respect to the p-i-n junction 48 of Arm B 44 along the line X-X'. The n-type region and the p-type region are arranged in the same order for each arm 42, 44 along the line X-X'.

The optical interferometer device 40 in FIG. 3B is shown as a device in which both arms 42, 44 are driven by means of a differential electrical drive. The n-type regions of the junctions 46, 48 of the arms 42, 44 are electrically coupled to each other, and the p-type regions of the junctions 46, 48 of the arms 42, 44 are electrically coupled to each other. In particular, the n-type region of Arm A 42 and n-type region of Arm B 44 are connected to a reference voltage $V_{ref}$ 104. The p-type region of Arm A 42 and n-type region of Arm B 44 are respectively connected to a drive signal 106 and an inverse of drive signal 106'. Such a device can be an optical modulator, such as a depletion type modulator. The modulator can be drive by a high speed (typically in the order of GHz) component of the drive signal and a direct current (DC) bias, which are mixed by means of a bias-T circuit (not shown). One p-n junction can be strongly reversed biased, and the other p-n junction can be weakly reverse biased. When the device switches between a 0 state and a 1 state, the roles of the two arms are swapped. Alternatively, the optical interferometer device 40 can be a switch.

Figure 5A:
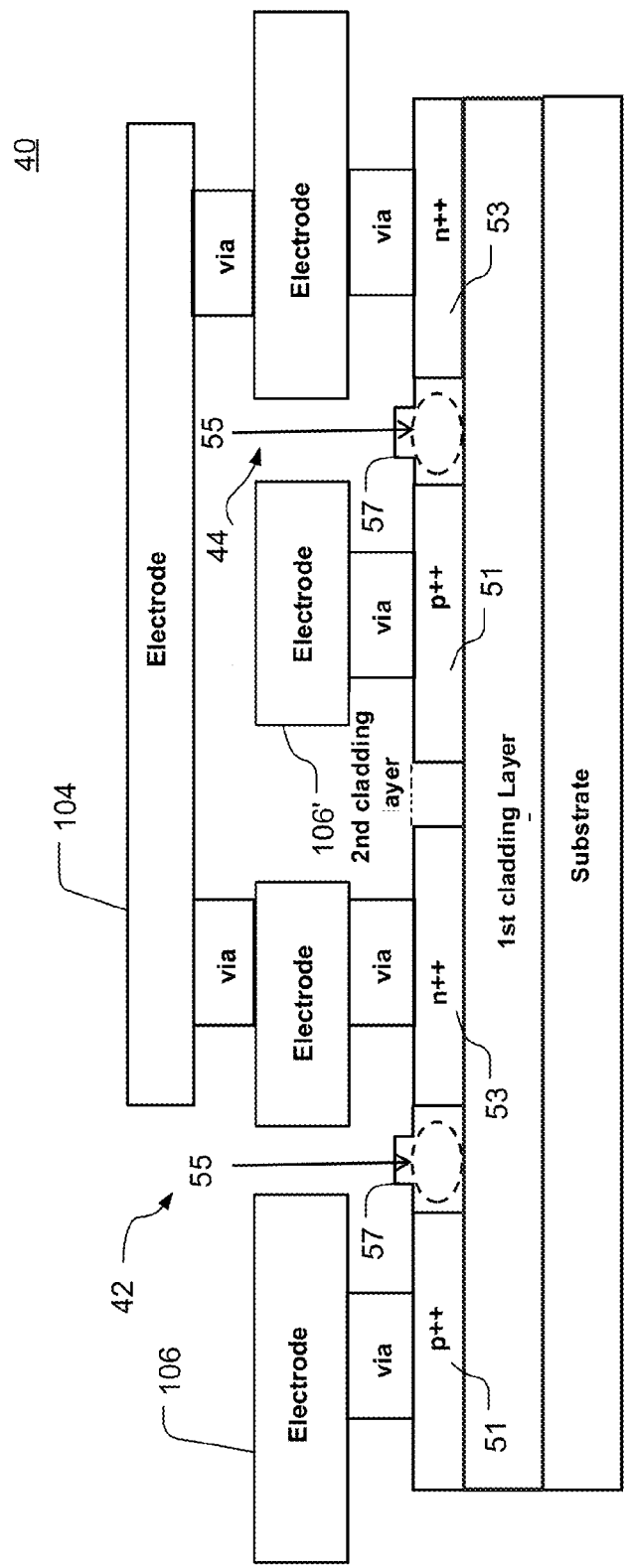
FIG. 5A is a cross-sectional view of the optical interferometer device of FIG. 4, taken along the line X-X'.

FIG. 5A is a cross-sectional view of the optical interferometer device 40 of FIG. 4, taken along the line X-X.

As shown in the cross-sectional view, each arm 42, 44 includes a p-n junction formed by a p-type region 51 and a n-type region 53 with optical mode 55 formed in an undoped or lightly-doped core between the p-type region 51 and the n-type region 53. The location of the optical mode 55 supported by the respective optical waveguide is defined by a ridge portion 57 formed by the pattern of the lithographic mask. The optical mode 55 is intended to be located in the center between the p-type region 51 and the n-type region 53 so that the two arms 42, 44 can be identical in the device 20.

Figure 5B:
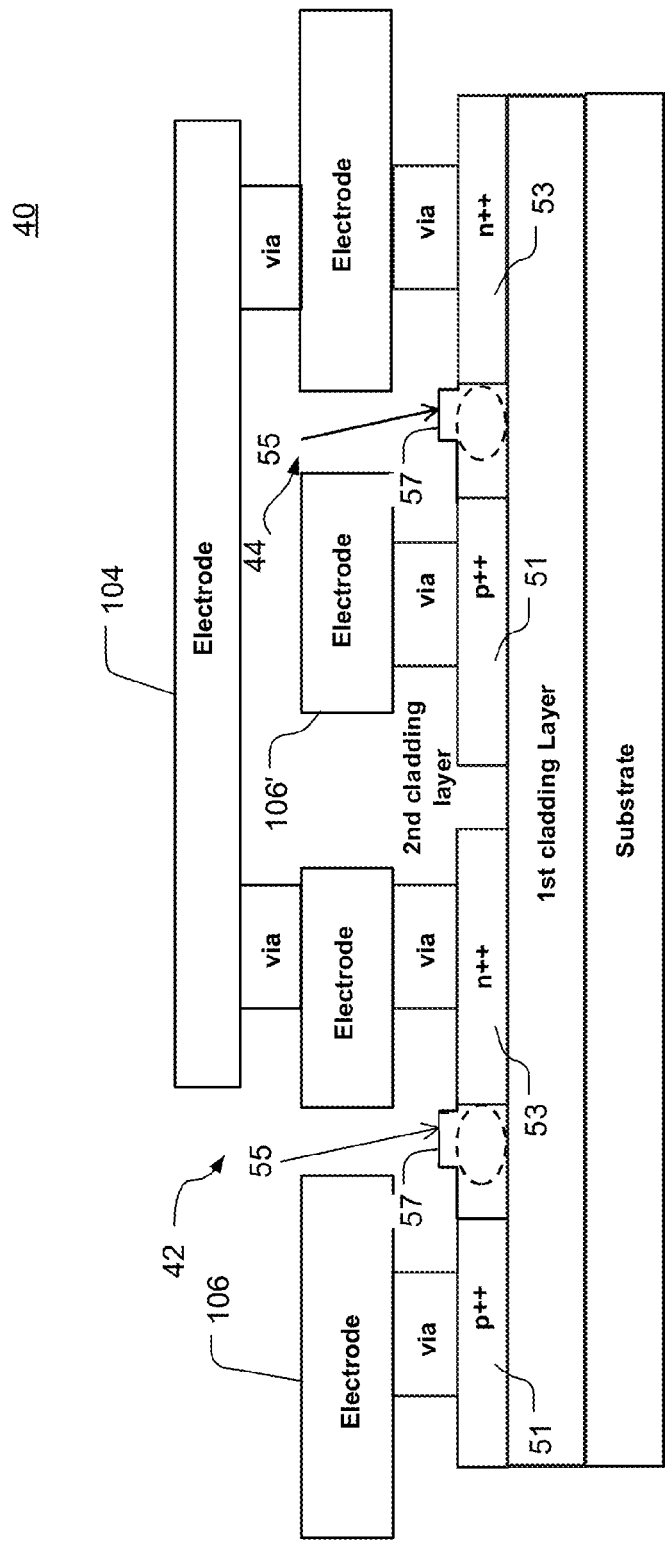
FIG. 5B is a cross-sectional view of the optical interferometer device of FIG. 4, showing the result of an asymmetric fabrication.

FIG. 5B is a cross-sectional view of the optical interferometer device 50 of FIG. 4, showing a result of an asymmetric fabrication.

As shown in FIG. 5B, the optical modes 55 have moved negligibly with respect to the silicon core. This may be caused by misalignment of lithographic mask in the formation of the optical modes 55. As a result of the misalignment of the optical mode 55 with respect to the p-n regions, n-type doping is closer to the optical mode 55 for Arm A 42. But the translationally symmetric arrangement of the two arms 42, 44 enables a similar result for Arm B 44, in that n-type doping is also made closer to the optical mode 59 for Arm B 44. This way, the two arms 42, 44 can still maintain a good balance in terms of optical absorption and a better balance of optoelectronic response between the two arms 42, 44 of the interferometer can be achieved.

Figure 6:
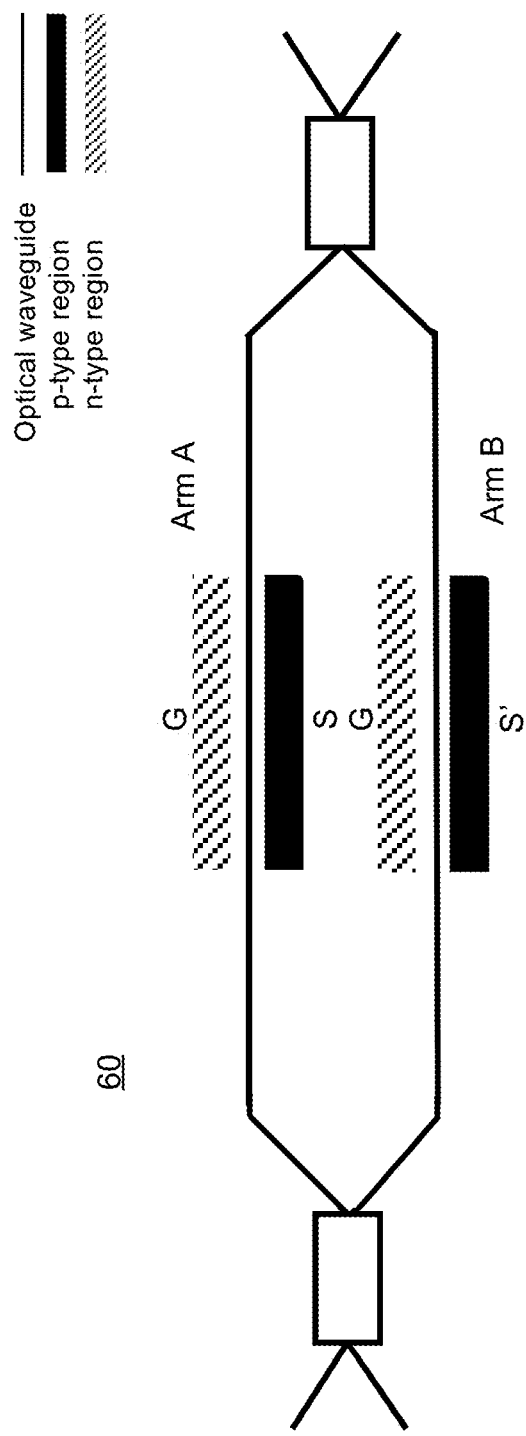
FIG. 6 is an electrical layout for a high speed modulator according to an embodiment of the disclosure.

FIG. 6 is an electrical layout for a high speed modulator 60 according to an embodiment of the disclosure. For high speed modulators, high speed drives usually have reflection symmetry, because impedance controlled off-chip connections tend to be symmetric to reduce radiation and common mode effects. For example, a typical form of a differential drive connector (or bond pad) is in the form of GS'S'G. G refers to an electrode carrying an electrical ground potential or a reference voltage $V_{ref}$; S refers to an electrode carrying an electrical signal; and S' refers to an electrode carrying the inverse of the electrical signal that is carried by S. In the embodiment illustrated by way of FIG. 6, the G and G' electrodes are connected to n-type regions, and the S and S' electrodes are connected to p-type regions. One trace (e.g. the ground trace) can be jumped over or under the other trace near electrical terminations.

If the two arms are far apart (for example, 0.4 mm apart), then the two arms effectively act as two independent transmission lines on the chip. In particular, the transmission line for Arm A can be arranged as GS, and the transmission line for Arm B can also be arranged as GS'. S' can be routed under or over G to connect to the symmetric GS'S'G bond pads. Alternatively, S can be routed under or over G to connect to the symmetric GS'S'G bond pads.

According to various embodiments of the disclosure, the junctions 26, 28, 46, 48 of Arms 22, 24, 42, 44 extend along the respective waveguide arms, such that a distance between n-type regions of the junctions 26, 28, 46, 48 is substantially equal to a distance between the p-type regions of the junctions 26, 28, 46, 48. As well, as shown in the various embodiments, the junctions 26, 28, 46, 48 comprise parallel sections.

In the embodiment illustrated by way of example in FIGS. 2 and 4, the waveguides 21, 23, 41, 43 are shown as straight waveguides and parallel with respect to each other (parallel to the line Y-Y'). It should however be understood that the waveguides 21, 23, 41, 43 do not need to be straight and can present in various other shapes. For example, each waveguide arm 22, 24, 42, 44 can include at least one bend. The arrangements of the junctions 26, 28, 46, 48 on the waveguides 21, 23, 41, 43 can be different from the arrangements shown in FIGS. 2 and 4. For example, the relative position of the junction 26, 28, 46, 48 on the waveguide 21, 23, 41, 43 can be different. The n-type region of the junction 26, 28, 46, 48 can include a plurality of n-type segments and the p-type region of the junction 26, 28, 46, 48 can include a plurality of p-type segments. The segments of the same doping type can be connected or disjoint. The n-type segments and the p-type segments of Arm 2 22, 42 are translationally symmetric with respect to the n-type segments and the p-type segments of Arm 1 24, 44 in the waveguide plane.

FIG. 7A-7E illustrate an optical interferometer device containing junctions, according to some alternative embodiments of the disclosure.

FIG. 7A illustrates an example optical interferometer 70A, in which the n-type region and the p-type region of the second waveguide arm 74 and the n-type region and the p-type region of the first waveguide arm 72 are located at different positions along the waveguide.

FIG. 7B illustrates an example optical interferometer 70B, in which the first and second waveguide arms 72, 74 include bends.

FIG. 7C illustrates an example optical interferometer 70C, in which the n-type region and the p-type region of each waveguide arm 72, 74 are L-shaped including connected segments.

FIG. 7D illustrates an example optical interferometer 70D, in which the n-type region includes a plurality of n-type segments 79 and the p-type region includes a plurality of p-type segments 77, and the n-type segments 79 and the p-type segments 77 of the second waveguide arm 74 are translationally symmetric with respect to the n-type segments 79 and the p-type segments 77 of the first waveguide arm 72 in the waveguide plane.

Figure 7E:
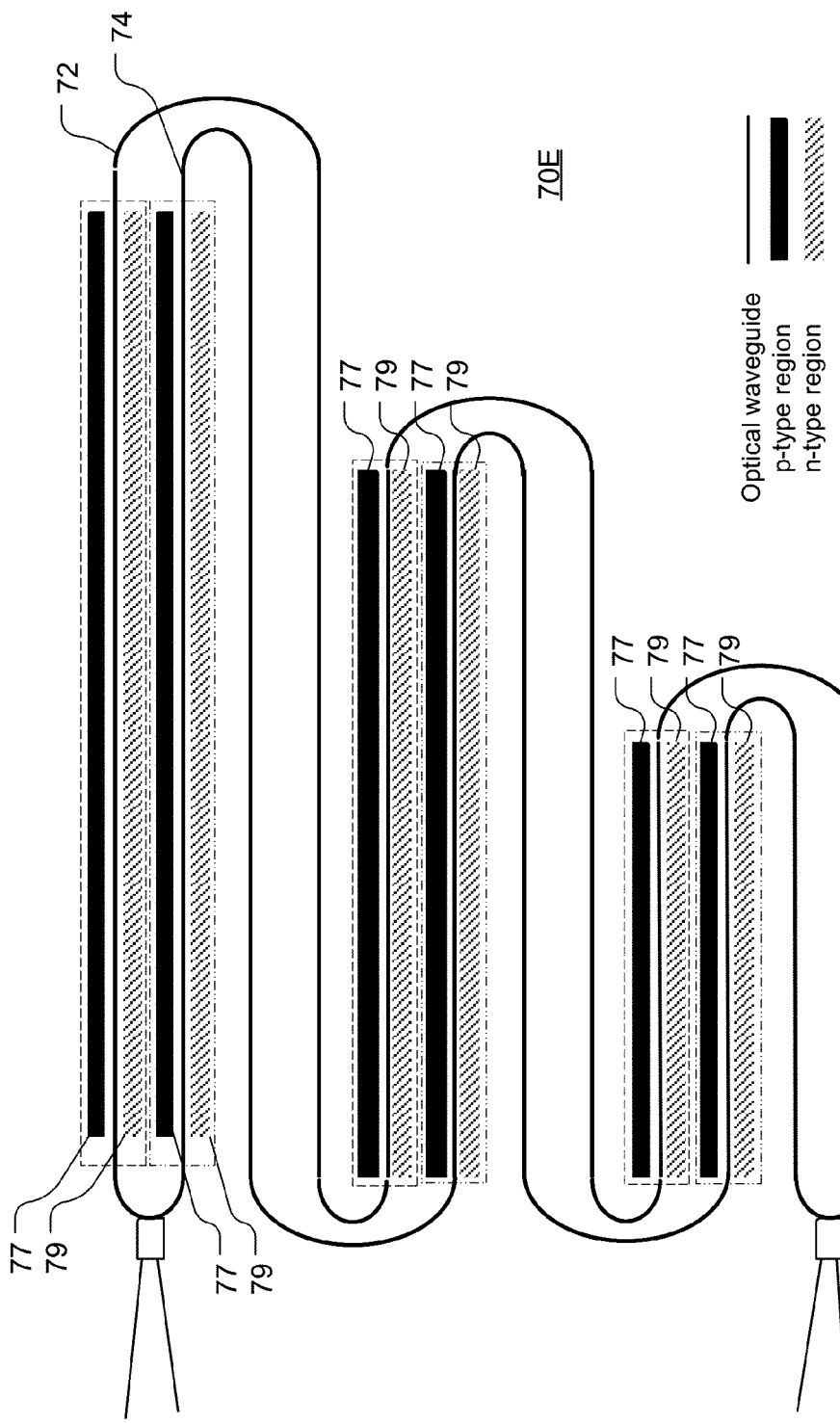
FIG. 7E is a schematic diagram of an optical interferometer device, according to another alternative embodiment of the disclosure.

FIG. 7E illustrates another example of optical interferometer device 70E (for example, a modulator) including multiple segments in each waveguide arm 72, 74. Each waveguide arm 72, 74 is zig-zag shaped including at least three parallel sections. Doping region 77, 79 of each arm 72, 74 includes three segments that are arranged on the three parallel sections, respectively. Each n-type segment and the p-type segment of Arm 2 74 are translationally symmetric with respect to the corresponding n-type segment and p-type segment of Arm 1 72 within the waveguide plane.

The complex shapes of the optical interferometers 70B-70E of FIGS. 7B-7E may be required to improve the density of placement of various optical circuits on a silicon photonic chip.

As illustrated by the above exemplary embodiments, in a waveguide interferometer having two waveguide arms, the second waveguide arm can be translationally symmetric with respect to the first waveguide arm along any vector direction within the waveguide plane. The shapes of the arms, the optical waveguides, p-type regions, and/or n-type regions are not limited to the illustrated shapes and do not need to be straight. For example, the arms, the optical waveguides, p-type regions, and/or n-type regions may be L-shaped, or form a zig-zag shape, or any other shape containing bends.

Although in the embodiments shown by way of the figures, devices are shown to have specific drive circuitries or electrical drive arrangements, it should be appreciated that the optical interferometer devices are not limited to the illustrated circuitries or arrangements and other suitable circuitries or arrangements are also possible, depending on the functions of the optical interferometer devices.

For simplicity of illustration, in the embodiments shown by way of the figures above, the p-n junction is shown as strictly laterally-patterned, i.e., the exact locations of the p and n regions relative to the waveguide is in the waveguide plane parallel to the substrate. However, it should be appreciated that some p-n junctions can be formed to have both a lateral as well as a vertical relationship between the p-type region and the n-type region. The translational symmetry refers to the lateral component of the relative positions.

Figure 12:
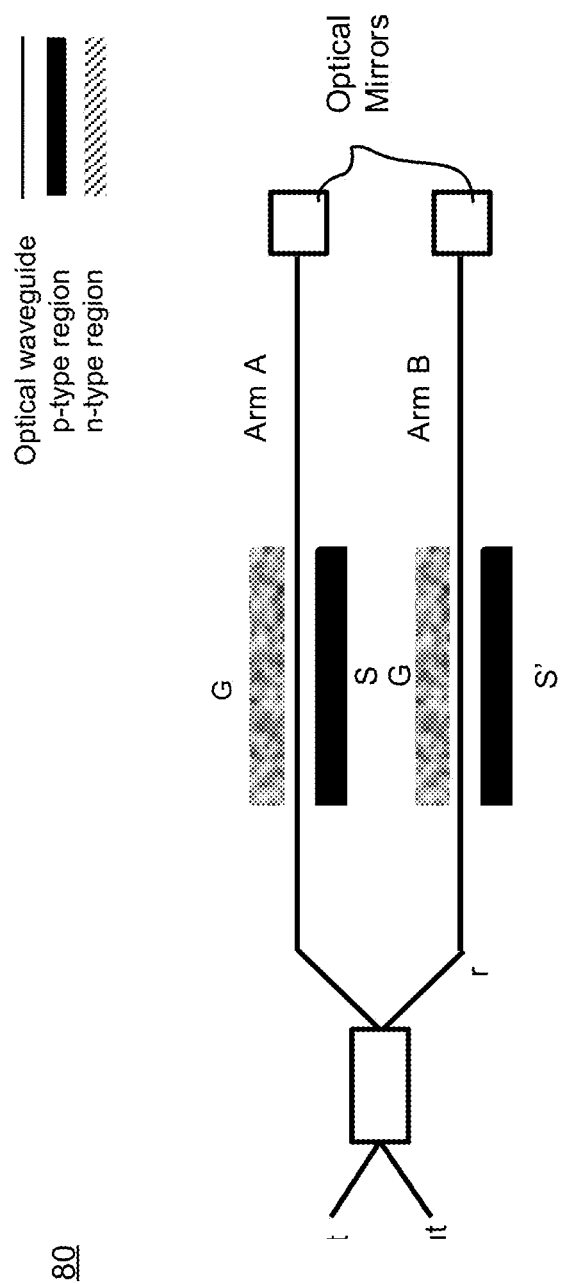
FIG. 12 is a schematic diagram of an optical interferometer device, according to another embodiment of the disclosure.
Figure 13:
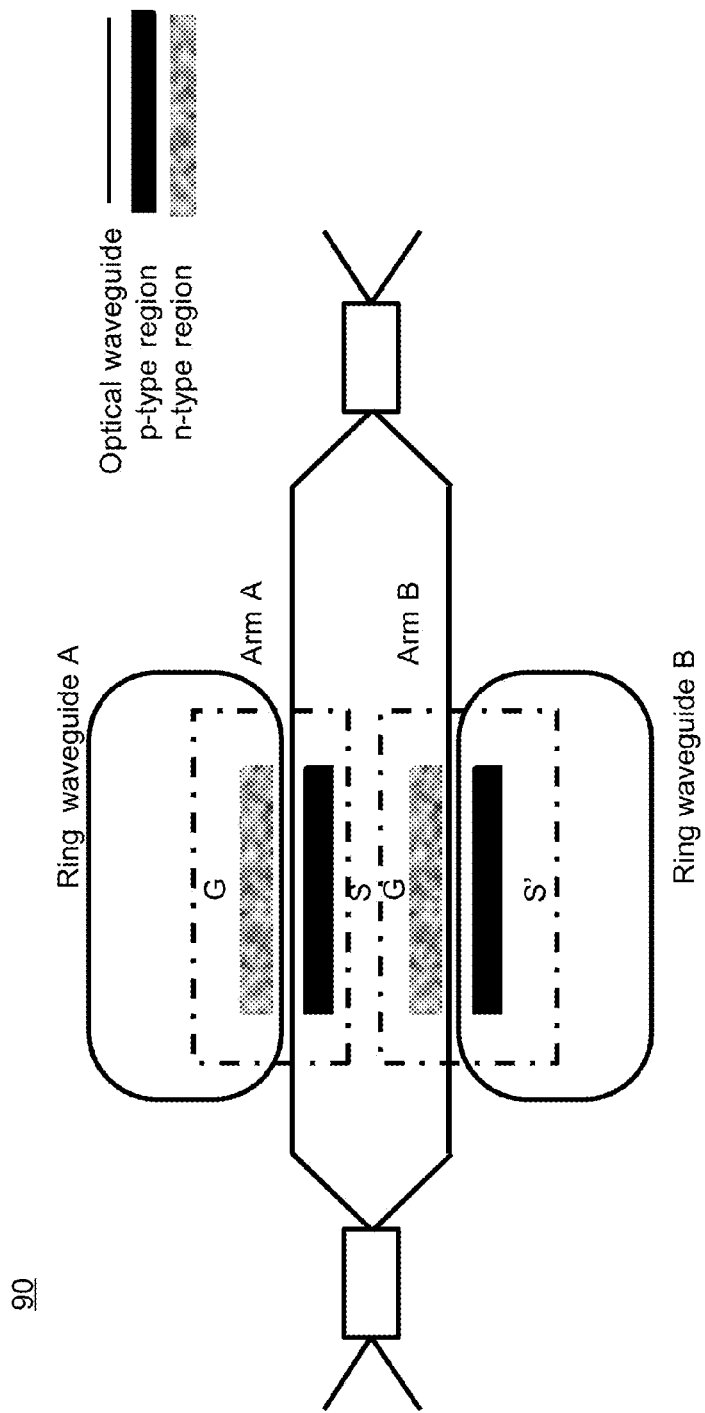
FIG. 13 is a schematic diagram of an optical interferometer device, according to another embodiment of the disclosure.

According to various embodiment of the disclosure, the p-n junction of each arm can be configured for carrier injection or carrier depletion. Alternatively, the p-n junction can be configured for Franz-Keldysh effect, or quantum confined stark effect (QCSE). The interferometer of the optical interferometer device can be a Mach-Zehnder interferometer, a Michelson interferometer 80 (FIG. 12), or a ring-assisted Mach-Zehnder interferometer 90 (FIG. 13).

Figure 14:
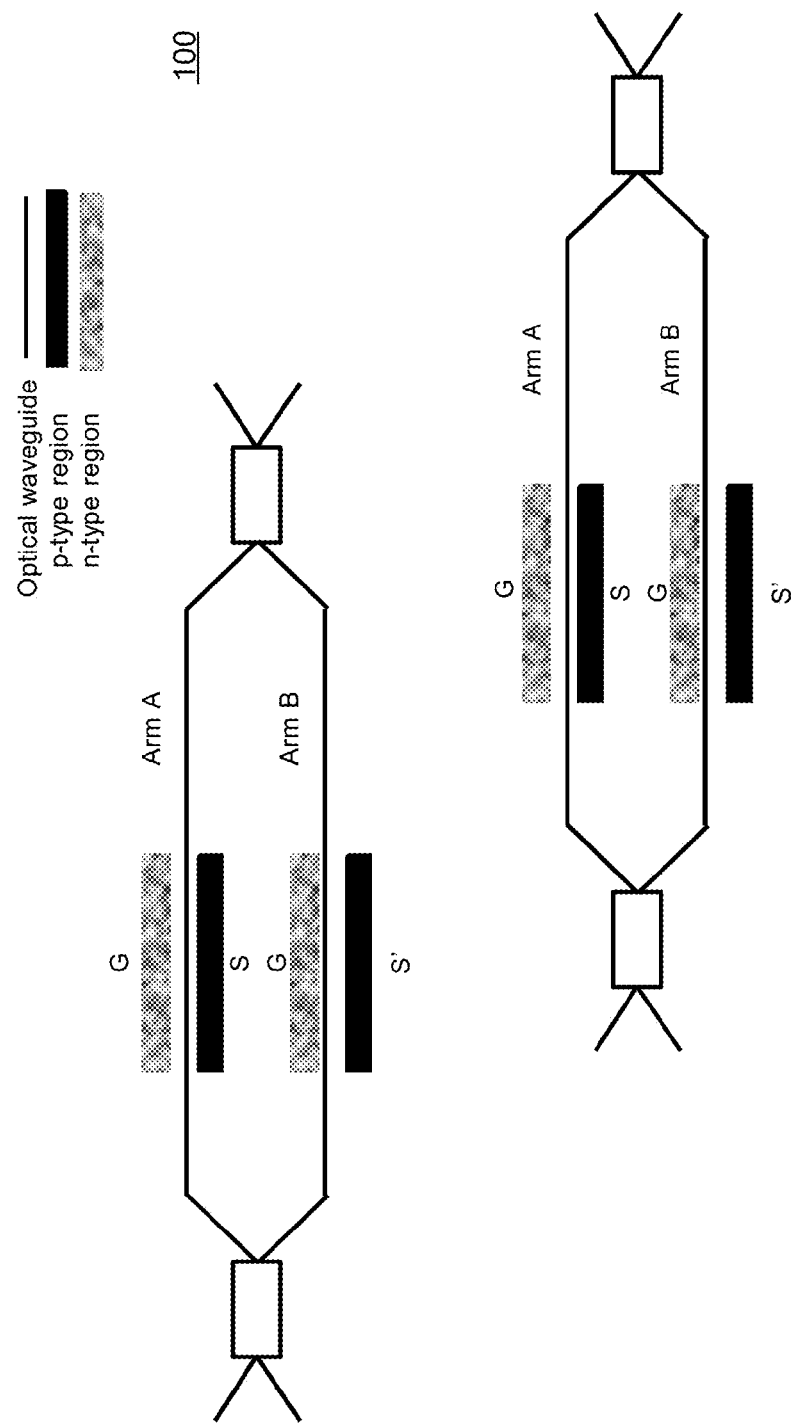
FIG. 14 is a schematic diagram of an optical interferometer device, according to another embodiment of the disclosure.

In some embodiments, the optical interferometer device may include more than one waveguide interferometer. Each waveguide interferometer may include first and second waveguide arms in a waveguide plane. Each waveguide arm includes a n-type region and a p-type region forming a junction. The n-type region and the p-type region of the second waveguide arm of each waveguide interferometer are translationally symmetric with respect to the n-type region and the p-type region of the corresponding first waveguide arm in the waveguide plane, as described above. FIG. 14 is a schematic diagram of an optical interferometer device 100, with more than one waveguide interferometer.

For semiconductor photonics, critical dimension control and lithographic overlay tolerances are among the most difficult requirements to achieve. To reduce the effect of lens distortion on overlay error, a single exposure tool may be used to print multiple critical layers for the same wafers. Both feed-back and feed-forward approaches need to be supported by process tools. The automation framework needs to comply with a large set of correcting models and algorithms, which might be highly non-linear.

As well, a better or more accurate lithography usually involves a higher cost and the cost of fabrication facility scales strongly with the lithography precision. The ITRS Roadmap (International Technology Roadmap for Semiconductors) is widely used in the semiconductor manufacturing industry to show the improvements in semiconductor manufacturing technology over time. The ITRS Roadmap tracks and forecasts the parameters of successive generations of fabrication plants, including successive generations of lithography. The ITRS Roadmap shows that the overlay tolerance has improved much more slowly than the minimum feature size. In other words, improving overlay precision is even harder than improving the size of devices. The value proposition of silicon photonics is to re-use legacy fabrication plants, to reduce the investment cost. Typical silicon photonic fabrication plants are in the range of 0.13 nm to 45 nm. It is highly undesirable to manufacture silicon photonics in a plant with better overlay tolerance, due to very high costs involved.

Figure 8:
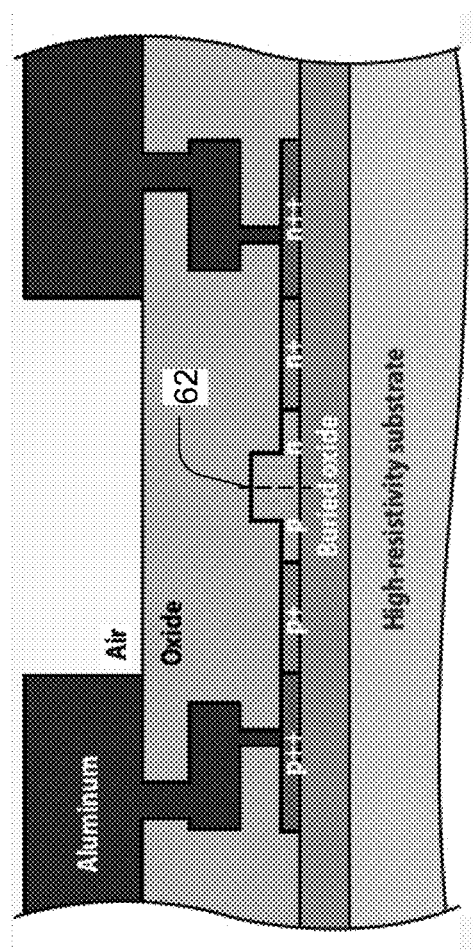
FIG. 8 is a cross-sectional view of an example optical interferometer device, showing the critical alignment of a p-n junction.

For sophisticated modulators, the actual boundary between a p-type region and a n-type region may be inside the optical core, so misalignment of the optical mode over the p-n junction can have a big effect on the drive voltage of different states. FIG. 8 is a cross-sectional view of an example optical interferometer device, showing a critical alignment of a p-n junction. The p-n junction is formed by multiple p-type regions and n-type regions, all formed inside the optical core, made of for example, silicon oxide. The exact location of the p-n junction 62 is difficult to control and a typical tolerance of the overlay error for the exact p-n junction location 62 can be about ±40 nm.

Figure 9A:
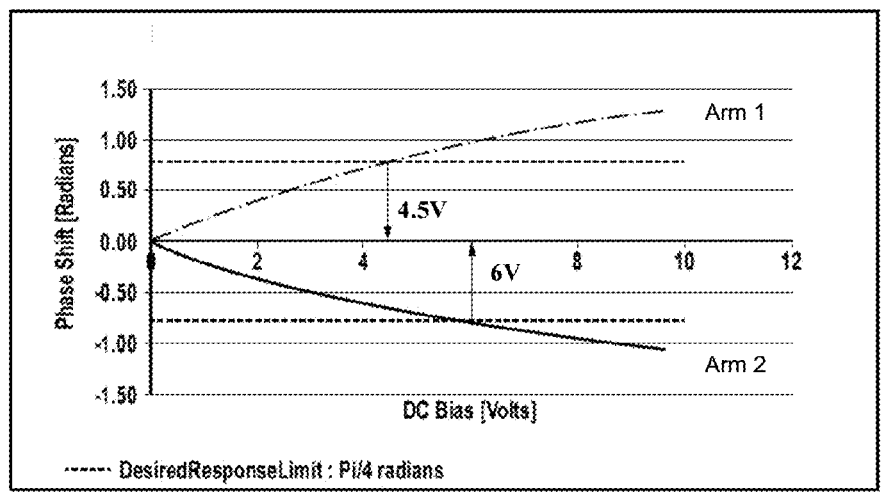
FIG. 9A is a test result showing a difference in phase shift response of two arms of an optical interferometer of FIG. 2B to a drive voltage.
Figure 9B:
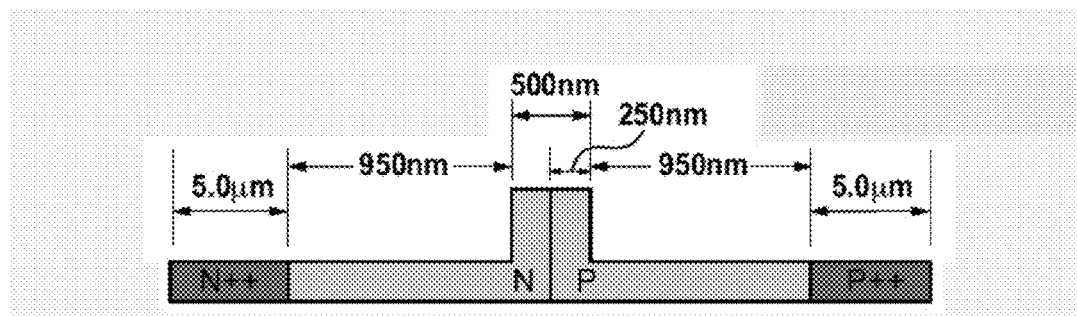
FIG. 9B is a cross-sectional view of an example optical interferometer device, showing the dimensions of a p-n junction.

FIG. 9A is a test result showing a difference in phase shift response of two arms of an optical interferometer of FIG. 2 to a drive voltage, for a typical manufacturing tolerance of approximately +/−40 nm. FIG. 9B is a cross-sectional view of the interferometer of FIG. 9A, showing the dimensions of its p-n junction.

In the intended design where two arms are identical, the drive voltage for 0 state should be the same as that for 1 state. However, as shown in FIG. 9A, for a given optical phase shift (e.g., π/4 radians), one state requires a drive voltage of 4.5 Volt and the other state requires a drive voltage of 6 Volt.

For optical modulators, the junction width of the p-n junction can be critical, especially for any complex doping arrangement. Due to the imbalance of the two arms of an interferometer, optoelectronic response of one arm can be different from that of the other arm. In turn, it can result in difficulty for driving conditions because the 0 state and the 1 state require different driving conditions.

For optical switches, the "natural" contrast ratio of a perfectly balanced cell is infinite and in an actual product a desired contrast ratio can be at least 20 dB. Asymmetry of the optical absorption between the two arms can reduce the contrast ratio.

Figure 10B:
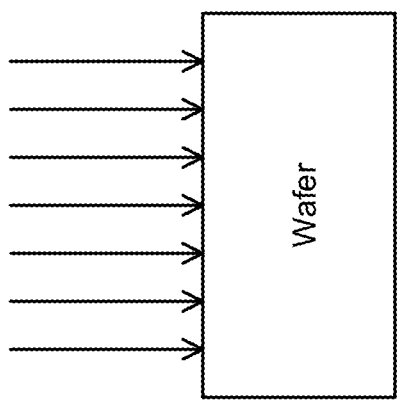
FIG. 10B is a schematic diagram of angled doping of a p-n junction.
Figure 10A:
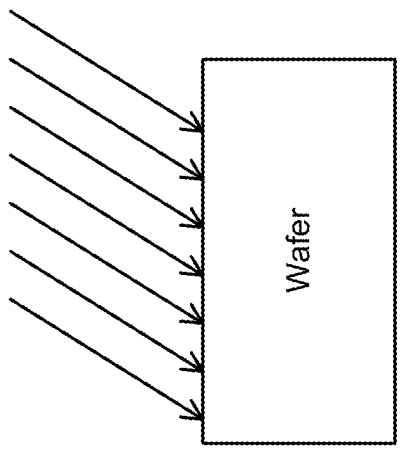
FIG. 10A is a schematic diagram of vertical doping of a p-n junction.

As well, some doping processes use angled implantation for some of the doping steps. FIG. 10A is a schematic diagram of vertical doping of a p-n junction. FIG. 10B is a schematic diagram of angled implantation doping of a p-n junction in comparison with FIG. 10A.

As shown in FIG. 10B, the doping beam (e.g., ion beam) can be a few degrees (e.g. 7 degrees) tilted so that it implants slightly from the side of the device. This can be done for the purpose of giving more freedom to choose the vertical profile of the doping density. This would introduce a deliberate asymmetric fabrication that creates an imbalance between the two arms.

According to the various embodiments, the two p-n junctions of the interferometer can achieve a translational symmetry for addressing a lateral misalignment of the optical mode.

Such optical interferometer devices may be used in an optical transmitter, particularly for reducing the drive voltage, as well as for photonic switches used in, e.g., optical add/drop Wavelength-division multiplexing (WDM) applications in Metro optical networks, WDM Passive Optical Network (PON) and/or reconfigurable data center networks and high-performance computing.

Figure 11:
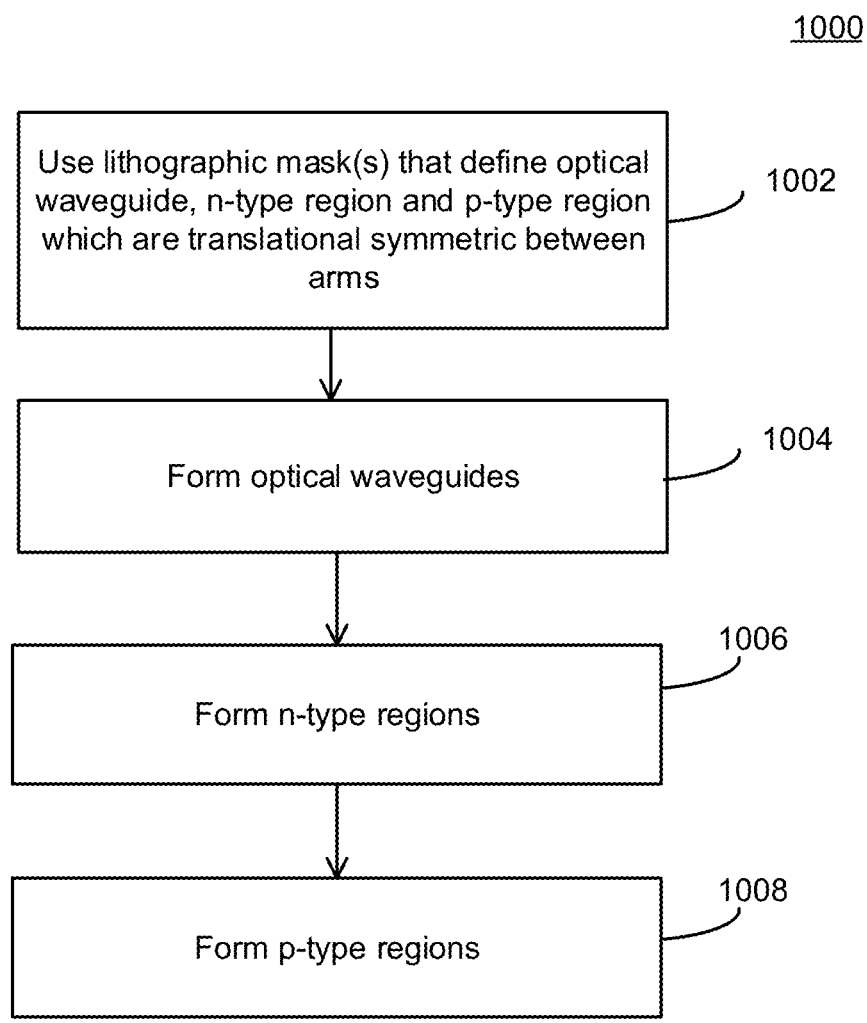
FIG. 11 is a method of manufacturing an optical interferometer device, according to an embodiment of the disclosure.

FIG. 11 is a method (1000) of manufacturing an optical interferometer device, according to an embodiment of the disclosure. The method includes using (1002) lithographic mask(s) that define the optical waveguide, n-type region and p-type region which are translationally symmetric in the waveguide plane between arms. The method further includes forming (1004) optical waveguides of a waveguide interferometer, the waveguide interferometer including first and second waveguide arms. This can be done by applying a lithographic mask to a core layer, such as a silicon core to form the optical waveguides. Separate lithographic masks can be used to define the p-type region and n-type region respectively. Alternatively, a single mask may be used to define both the p-type region and n-type region. The method also includes forming (1006) n-type regions for the first and second waveguide arms; and forming (1008) p-type regions for the first and second waveguide arms. P-type region and n-type region can be formed by doping processes. It is to be understood that steps (1004), (1006), (1008) can be applied in various sequences. That is, the lithography of the optical waveguide, the n-type region, and/or the p-type region can be applied in different sequences. As well, doping of the n-type region and/or the p-type region can be performed in between the lithography steps, or after all regions are formed. As a result of the lithographic patterns that define the structure in a translationally symmetric manner, the n-type region and the p-type region of the second waveguide arm are translationally symmetric with respect to the n-type region and the p-type region of the first waveguide arm in the waveguide plane, as described above.

The optical device according to the various embodiments can be formed using various semiconductor materials, such as silicon-based semiconductor materials. The optical device can also be formed by III-V semiconductor materials such as InGaAsP, InGaAlAs, InP, GaAs, GaAlAs. As a further example, the optical device may be based on quantum wells, such as quantum wells comprising alternating layers of Si and/or SiGe of alternating compositions or varying compositions, or quantum wells comprising alternating layers of III-V semiconductors of alternating compositions or varying compositions.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the disclosure and is not intended to limit the scope of the disclosure unless otherwise claimed.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical device, comprising:
   a waveguide interferometer including first and second waveguide arms in a waveguide plane, each waveguide arm comprising a n-type region and a p-type region forming a lateral p-n junction;
   wherein the n-type region and the p-type region of the second waveguide arm are translationally symmetric in the waveguide plane with respect to the n-type region and the p-type region, respectively, of the first waveguide arm,
   wherein the n-type regions of the junctions of the first and second waveguide arms are electrically coupled to each other, and wherein the p-type regions of the junctions of the first and second waveguide arms are electrically coupled to each other.

2. The optical device according to claim 1, wherein the junctions of the first and second waveguide arms extend along the respective waveguide arms, such that a distance between n-type regions of the junctions is substantially equal to a distance between the p-type regions of the junctions.

3. The optical device according to claim 1, wherein the junctions of the first and second waveguide arms comprise parallel sections.

4. The optical device according to claim 1, wherein the optical device is a photonic switch, an optical modulator, or a tunable optical filter.

5. The optical device according to claim 1, wherein the junction of each waveguide arm is formed by carrier injection.

6. The optical device according to claim 1, wherein the junction of each waveguide arm is formed by carrier depletion.

7. The optical device according to claim 1, wherein the junction of each waveguide arm is formed by Franz-Keldysh effect.

8. The optical device according to claim 1, wherein the junction of each waveguide arm is formed by quantum confined Stark effect (QCSE).

9. The optical device according to claim 1, wherein the waveguide interferometer is a Mach-Zehnder interferometer.

10. The optical device according to claim 1, wherein the waveguide interferometer is a Michelson interferometer.

11. The optical device according to claim 1, wherein the waveguide interferometer is a ring-assisted Mach-Zehnder interferometer.

12. The optical device according to claim 1, wherein each waveguide arm includes at least one bend.

13. The optical device according to claim 12, wherein each junction is L-shaped.

14. The optical device according to claim 1, wherein each waveguide arm has a zig-zag shape.

15. The optical device according to claim 1, wherein the n-type region includes a plurality of n-type segments and the p-type region includes a plurality of p-type segments, and wherein the n-type segments and the p-type segments of the second waveguide arm are translationally symmetric with respect to the n-type segments and the p-type segments of the first waveguide arm in the waveguide plane.

16. The optical device according to claim 1, further comprising a plurality of waveguide interferometers including the waveguide interferometer, wherein each waveguide interferometer includes first and second waveguide arms on a waveguide plane, each waveguide arm including a n-type region and a p-type region forming a junction; and wherein the n-type region and the p-type region of the second waveguide arm of each waveguide interferometer are translationally symmetric with respect to the n-type region and the p-type region of the corresponding first waveguide arm in the waveguide plane.

17. An optical device, comprising:
   a waveguide interferometer including first and second waveguide arms in a waveguide plane, each waveguide arm comprising a n-type region and a p-type region forming a lateral p-n junction;
   wherein the n-type region and the p-type region of the second waveguide arm are translationally symmetric in the waveguide plane with respect to the n-type region and the p-type region, respectively, of the first waveguide arm,
   wherein the n-type region of the junction of the first waveguide is electrically coupled to the p-type region of the junction of the second waveguide.

18. A method of manufacturing an optical interferometer device, comprising:
   forming optical waveguides of a waveguide interferometer, the waveguide interferometer including first and second waveguide arms in a waveguide plane;
   forming n-type regions for the first and second waveguide arms; and
   forming p-type regions for the first and second waveguide arms;

wherein the n-type region and the p-type region of each waveguide arm form a lateral p-n junction between the n-type region and the p-type region, and the n-type region and the p-type region of the second waveguide arm are translationally symmetric in the waveguide plane with respect to the n-type region and the p-type region, respectively, of the first waveguide arm, wherein the n-type regions of the junctions of the first and second waveguide arms are electrically coupled to each other, and wherein the p-type regions of the junctions of the first and second waveguide arms are electrically coupled to each other.

\* \* \* \* \*